United States Patent
Kataoka

(10) Patent No.: US 9,002,579 B2
(45) Date of Patent: Apr. 7, 2015

(54) STEERING ASSIST DEVICE

(75) Inventor: Hiroaki Kataoka, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/164,038

(22) Filed: Jun. 20, 2011

(65) Prior Publication Data
US 2011/0251758 A1 Oct. 13, 2011

Related U.S. Application Data

(63) Continuation of application No. PCT/JP2010/001794, filed on Mar. 12, 2010.

(51) Int. Cl.
| | |
|---|---|
| A01B 69/00 | (2006.01) |
| B62D 6/00 | (2006.01) |
| B62D 11/00 | (2006.01) |
| B62D 12/00 | (2006.01) |
| B63G 8/20 | (2006.01) |
| B63H 25/04 | (2006.01) |
| G05D 1/00 | (2006.01) |

(Continued)

(52) U.S. Cl.
CPC .................... B62D 15/025 (2013.01)

(58) Field of Classification Search
CPC .................................... B62D 15/025
USPC ............................................. 701/41
See application file for complete search history.

(56) References Cited

U.S. PATENT DOCUMENTS 6,092,619 A * 7/2000 Nishikawa et al. .......... 180/446
6,212,453 B1 * 4/2001 Kawagoe et al. .............. 701/41

(Continued)

FOREIGN PATENT DOCUMENTS

DE 10 2007 020 280 A1 11/2008
EP 1 950 115 A2 7/2008

(Continued)

OTHER PUBLICATIONS

International Search Report and Written Opinion issued Jun. 1, 2010 in International Application No. PCT/JP2010/001794 filed Mar. 12, 2010.

(Continued)

*Primary Examiner* — Fadey Jabr
*Assistant Examiner* — Lail Kleinman
(74) *Attorney, Agent, or Firm* — Oblon, McClelland, Maier & Neustadt, L.L.P.

(57) ABSTRACT

A steering assist device capable of appropriately reducing a steering load on a driver is provided. A steering assist device for assisting a steering operation of a driver who drives a vehicle, comprises: an auxiliary torque generation section for causing a steering device of the vehicle to generate an auxiliary torque that assists a steering force of the driver; a first torque control section for controlling the auxiliary torque so as to cause the vehicle to perform turning in accordance with a curvature of a travel lane in which the vehicle travels; a second torque control section for controlling the auxiliary torque so as to bring the position of the vehicle close to a center line of the travel lane; a lane change determination section for determining whether or not the vehicle is performing lane change; and a control suppression section for suppressing the control of the auxiliary torque by the second torque control section when it is determined that the vehicle is performing lane change.

13 Claims, 10 Drawing Sheets

(51) Int. Cl.
*G06F 7/00* (2006.01)
*G06F 17/00* (2006.01)
*G06F 19/00* (2011.01)
*B62D 15/02* (2006.01)

(56) References Cited

U.S. PATENT DOCUMENTS

| | | | |
|---|---|---|---|
| 7,062,382 B2 * | 6/2006 | Courtenay et al. | 701/301 |
| 7,885,730 B2 * | 2/2011 | Kaufmann et al. | 701/1 |
| 2003/0078712 A1 * | 4/2003 | Shimakage et al. | 701/41 |
| 2005/0090955 A1 * | 4/2005 | Engelman et al. | 701/36 |
| 2007/0185594 A1 * | 8/2007 | Iwazaki et al. | 700/42 |
| 2008/0183342 A1 | 7/2008 | Kaufmann et al. | |
| 2009/0048738 A1 * | 2/2009 | Iwazaki et al. | 701/44 |
| 2009/0091435 A1 * | 4/2009 | Bolourchi | 340/435 |
| 2009/0222170 A1 * | 9/2009 | Scherl et al. | 701/44 |
| 2009/0319113 A1 | 12/2009 | Lee | |
| 2010/0185363 A1 * | 7/2010 | Buerkle et al. | 701/41 |

FOREIGN PATENT DOCUMENTS

| | | |
|---|---|---|
| JP | 9-301210 | 11/1997 |
| JP | 9-301210 A | 11/1997 |
| JP | 10-297516 | 11/1998 |
| JP | 2001-48034 | 2/2001 |
| JP | 2001-48034 A | 2/2001 |
| JP | 2008-12989 | 1/2008 |
| JP | 2008-12989 A | 1/2008 |
| JP | 2008-120228 | 5/2008 |
| JP | 2009-18626 | 1/2009 |
| JP | 2010-15436 | 1/2010 |

OTHER PUBLICATIONS

International Preliminary Examination Report issued Oct. 21, 2010 in International Application No. PCT/JP2010/001794 filed Mar. 12, 2010.

* cited by examiner

STEERING ASSIST DEVICE

TECHNICAL FIELD

The present invention relates to a steering assist device and, more particularly, to a steering assist device for assisting a steering force of a driver of a vehicle.

BACKGROUND ART

Conventionally, in order to reduce burden on drivers driving vehicles, steering assist devices have been developed, each of which gives, to a steering, an auxiliary torque for assisting a steering force of a driver in accordance with a traveling state of a vehicle. As a type of such steering assist devices, a steering assist device has been developed, which gives, to a steering, an auxiliary torque so as to keep the position of a vehicle in a lane in which the vehicle travels. This steering assist device is known as a so-called LKA System (Lane Keeping Assist System).

An example of the above-described steering assist devices is disclosed in Patent Literature 1. A steering control device disclosed in Patent Literature 1 calculates a lateral target acceleration of a vehicle, which is required for the vehicle to travel in the center of a lane in which the vehicle travels. Then, the steering control device gives, to a steering, an auxiliary torque which is required for the lateral acceleration of the vehicle to reach the target acceleration. When the steering control device calculates the target acceleration, the steering control device controls the target acceleration by performing feed-forward control based on the curvature of the lane in which the vehicle travels. Further, the steering control device controls the target acceleration by performing feed-back control based on, for example, a distance from the center line of the lane in which the vehicle travels to the vehicle. According to the feed-forward control and the feed-back control, the torque of the steering is controlled so that the vehicle travels in the center of the lane, along the lane.

According to the control by the above-described steering assist device, even when the vehicle is performing lane change, that is, even when the vehicle intentionally leaves the lane in which the vehicle currently travels, an auxiliary torque that brings the vehicle back to the center of the lane might be generated. So, generally, the above-described steering assist device halts generation of an auxiliary torque while a direction indicator mounted on the vehicle is being operated.

CITATION LIST

Patent Literature

[PTL 1] Japanese Laid-Open Patent Publication No. 2009-18626

SUMMARY OF THE INVENTION

Problems To Be Solved By the Invention

In the control process by the conventional steering assist device, however, generation of an auxiliary torque might be halted even in a situation where the driver needs an auxiliary torque.

For example, a situation where a vehicle is traveling in a curve section is assumed. While the vehicle is traveling in the curve section, the steering assist device usually generates an auxiliary torque depending on the curve to reduce the steering load on the driver. Then, if the driver operates a direction indicator to perform lane change during traveling in the curve section, the steering assist device halts the generation of the auxiliary torque that has been outputted up to then. Such a sudden halt of generation of the auxiliary torque might cause a rapid increase in the steering load on the driver. In this case, such an increase in the steering load might cause the driver to feel stress.

The present invention is made to resolve the above-described problems, and has an object to provide a steering assist device capable of appropriately reducing the steering load on the driver.

Solution to the Problems

To achieve the above objects, the present invention has the following aspects. Specifically, a first aspect of the present invention is directed to a steering assist device for assisting a steering operation of a driver who drives a vehicle. The steering assist device includes: an auxiliary torque generation section for causing a steering device of the vehicle to generate an auxiliary torque that assists a steering force of the driver; a first torque control section for controlling the auxiliary torque so as to cause the vehicle to perform turning in accordance with a curvature of a travel lane in which the vehicle travels; a second torque control section for controlling the auxiliary torque so as to bring the position of the vehicle close to a center line of the travel lane; a lane change determination section for determining whether or not the vehicle is performing lane change; and a control suppression section for suppressing the control of the auxiliary torque by the second torque control section when it is determined that the vehicle is performing lane change.

In a second aspect based on the first aspect, the steering assist device further includes: an imaging section for taking an image in front of the vehicle; a curvature calculation section for calculating, based on the image, a curvature of the travel lane in which the vehicle travels; an offset distance calculation section for calculating an offset distance from the center line of the travel lane to the vehicle; and a deflection angle calculation section for calculating a deflection angle which is formed between a straight line indicating a direction along which the vehicle travels, and the center line of the travel lane. The first torque control section controls the auxiliary torque in accordance with the curvature calculated by the curvature calculation section so as to cause the vehicle to perform turning in accordance with the curvature. The second torque control section controls the auxiliary torque in accordance with at least one of the offset distance and the deflection angle so as to bring the position of the vehicle close to the center line of the travel lane.

In a third aspect based on either of the first and second aspects, the steering assist device further includes: a lane change direction determination section for determining, when the vehicle is performing lane change, in which direction, left or right, the vehicle performs the lane change; and an auxiliary torque acting direction determination section for determining in which direction, left or right, the vehicle turns due to the auxiliary torque controlled by the second torque control section. The control suppression section suppresses the control of the auxiliary torque by the second torque control section only when it is determined that the vehicle is performing lane change, and the direction of lane change does not coincide with the direction of turning.

In a fourth aspect based on the first aspect, the lane change determination section determines that the vehicle is performing lane change when a direction indicator mounted on the vehicle is being operated, and determines that the vehicle is not changing lanes when the direction indicator is not being operated.

In a fifth aspect based on the first aspect, the steering assist device further includes a steering torque detection section for detecting a steering torque generated by an operation of the driver of the vehicle. The lane change determination section determines that the vehicle is performing lane change when the steering torque is equal to or greater than a predetermined steering torque threshold value, and determines that the vehicle is not changing lanes when the steering torque is less than the steering torque threshold value.

In a sixth aspect based on the fifth aspect, the steering assist device further includes a steering torque threshold calculation section for calculating the steering torque threshold value in accordance with the curvature of the travel lane in which the vehicle travels.

In a seventh aspect based on the first aspect, the steering assist device further includes a steering angle detection section for detecting a steering angle of the vehicle. The lane change determination section determines that the vehicle is performing lane change when the steering angle is equal to or greater than a predetermined steering angle threshold value, and determines that the vehicle is not performing lane change when the steering angle is smaller than the steering angle threshold value.

In an eighth aspect based on the seventh aspect, the steering assist device further includes a steering angle threshold calculation section for calculating the steering angle threshold value in accordance with the curvature of the travel lane in which the vehicle travels.

In a ninth aspect based on the second aspect, the lane change determination section determines that the vehicle is performing lane change when the offset distance is equal to or longer than a predetermined distance threshold value, and determines that the vehicle is not performing lane change when the offset distance is shorter than the distance threshold value.

In a tenth aspect based on the ninth aspect, the steering assist device further includes: a lane width calculation section for calculating the width of the travel lane in which the vehicle travels; and a threshold calculation section for calculating the distance threshold value in accordance with the width of the travel lane.

In an eleventh aspect based on the first aspect, the lane change determination section determines that the vehicle is performing lane change when a hazard lamp mounted on the vehicle is being operated, and determines that the vehicle is not performing lane change when the hazard lamp is not operated.

In a twelfth aspect based on the second aspect, the second torque control section controls the auxiliary torque in such a manner that the greater a value obtained by multiplying the offset distance and the deflection angle by predetermined gain values, respectively, is, the greater the auxiliary torque is. The control suppression section changes the gain value to a smaller value when it is determined that the vehicle is performing lane change than when it is determined that the vehicle is not performing lane change, and thus suppresses the control of the auxiliary torque by the second torque control section.

In a thirteenth aspect based on the second aspect, the second torque control section controls the auxiliary torque in such a manner that the greater the offset distance and the deflection angle are, the greater the auxiliary torque is. The control suppression section corrects the values of the offset distance and the deflection angle, which are input to the second torque control section, to smaller values when it is determined that the vehicle is performing lane change than when it is determined that the vehicle is not performing lane change, and thus suppresses the control of the auxiliary torque by the second torque control section.

Effects of the Invention

According to the first aspect, a steering load on a driver can be appropriately reduced. Specifically, according to the first aspect, when it is determined that the vehicle is performing lane change, the control of the auxiliary torque to bring the position of the traveling vehicle close to the center line of the travel lane is suppressed, and only the control of the auxiliary torque to cause the vehicle to perform turning in accordance with the curvature of the lane is executed. Therefore, when the driver tries to intentionally leave the current travel lane, such as when the driver tries to perform lane change, generation of an auxiliary torque that brings the vehicle back to the center line of the travel lane is suppressed. On the other hand, an auxiliary torque required for curve traveling or the like is continuously generated before, during, and after the lane change. Accordingly, the driver can drive the vehicle comfortably with less steering load.

According to the second aspect, the auxiliary torque can be appropriately controlled based on the shape of the travel lane, and the relative position of the vehicle to the center line of the travel lane.

According to the third aspect, while the vehicle is performing lane change, the control by the second torque control section is suppressed only when the direction in which the auxiliary torque controlled by the second torque control section acts is different from the direction of the lane change of the vehicle. In other words, even when the vehicle is performing lane change, the control by the second torque control section is executed as usual so long as the direction in which the auxiliary torque controlled by the second torque control section acts is the same as the direction of the lane change of the vehicle. That is, the control by the second torque control section to increase the auxiliary torque is possible for the direction of the auxiliary torque intended by the driver. Accordingly, for example, if the vehicle is moved to a direction not intended by the driver due to a disturbance such as lateral wind, the auxiliary torque can be increased in the direction intended by the driver by using the second torque control section as well as the first torque control section. Therefore, the driver can perform a steering operation in his/her intended direction with smaller steering load as compared to the case where the control by the second torque control section is suppressed.

According to the fourth aspect, whether or not the vehicle is performing lane change can be determined by a simple process in accordance with whether or not the direction indicator is being operated.

According to the fifth aspect, whether or not the vehicle is performing lane change can be determined by a simple process in accordance with the magnitude of the steering torque.

According to the sixth aspect, the steering torque threshold value can be set to an appropriate value in accordance with the curvature of the travel lane. Accordingly, whether or not the vehicle is performing lane change can be accurately determined.

According to the seventh aspect, whether or not the vehicle is performing lane change can be determined by a simple process in accordance with the magnitude of the steering angle.

According to the eighth aspect, the steering angle threshold value can be set to an appropriate value in accordance with the curvature of the travel lane. Accordingly, whether or not the vehicle is performing lane change can be accurately determined.

According to the ninth aspect, whether or not the vehicle is performing lane change can be determined by a simple process in accordance with the offset distance from the center line of the travel lane to the vehicle.

According to the tenth aspect, the offset distance threshold value can be set to an appropriate value in accordance with the width of the travel lane. Accordingly, whether or not the vehicle is performing lane change can be accurately determined.

According to the eleventh aspect, the control of the auxiliary torque by the second torque control section can be suppressed while the hazard lamp is being operated. For example, there is an emergency case where the driver pulls off to the side of the road with the hazard lamp blinking. In such a case, according to the eleventh aspect, generation of an auxiliary torque that brings the vehicle back to the center of the travel lane is suppressed, and thus the driver can easily drive the vehicle.

According to the twelfth aspect, the control of the auxiliary torque by the second torque control section can be easily suppressed by a simple process of changing the gain value. Further, the degree of the suppression of the control by the second torque control section can be arbitrarily adjusted by arbitrarily adjusting the magnitude of the gain value.

According to the thirteenth aspect, the control of the auxiliary torque by the second torque control section can be easily suppressed by a simple process of correcting the values of the parameters (the offset distance and the deflection angle) when the second torque control section determines the value of the auxiliary torque.

BEST MODE FOR CARRYING OUT THE INVENTION

First Embodiment

The following will describe a steering assist device 1 according to a first embodiment of the present invention. The steering assist device 1 is a device for assisting a steering force of a driver. The first embodiment will describe an example where the steering assist device 1 is mounted on a vehicle 100.

Figure 1:
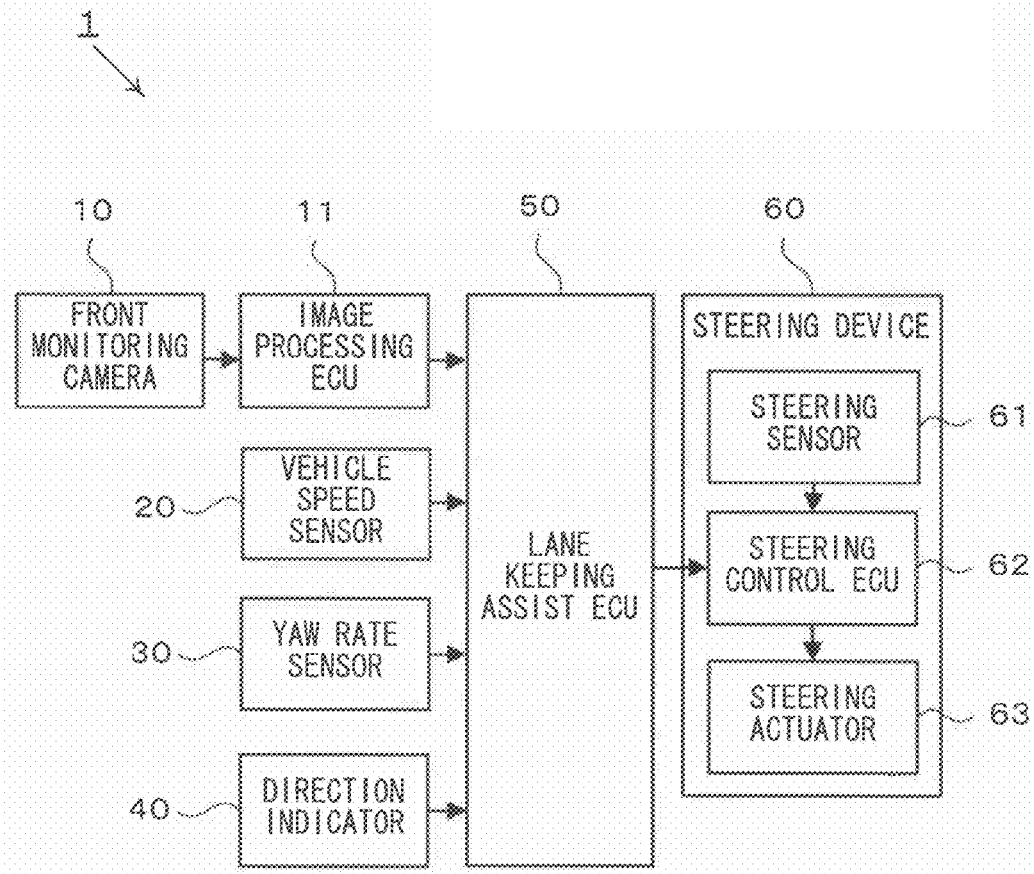
FIG. 1 is an example of a block diagram illustrating the configuration of a steering assist device according to a first embodiment.

First of all, the configuration of the steering assist device will be described with reference to FIG. 1. FIG. 1 is an example of a block diagram illustrating the configuration of the steering assist device according to the first embodiment. As shown in FIG. 1, the steering assist device is provided with a front monitoring camera 10, an image processing ECU 11, a vehicle speed sensor 20, a yaw rate sensor 30, a direction indicator 40, a lane keeping assist ECU 50, and a steering device 60.

The front monitoring camera 10 is a device for taking an image in front of the vehicle 100 (referred to as a front image, hereinafter). The front monitoring camera 10 is typically an imaging device including an image sensor such as a CCD (Charge Coupled Device) sensor or a CMOS (Complementary Metal Oxide Semiconductor) sensor. The front monitoring camera 10, which has taken a front image, transfers data indicating the front image to the image processing ECU 11.

The image processing ECU 11 is typically an image processing device including an information processing device such as a CPU (Central Processing Unit), a storage device such as a memory, an interface circuit, and the like. The image processing ECU 11 calculates, based on the front image received from the front monitoring camera 10, a curvature R of a lane in which the vehicle 100 is currently traveling (referred to as a travel lane, hereinafter). The image processing ECU 11 may calculate a road curvature R by using any conventionally-known method. The image processing ECU 11, which has calculated a curvature R, transfers data indicating the curvature R to the lane keeping assist ECU 50.

The vehicle speed sensor 20 is a sensor device for detecting a vehicle speed V of the vehicle 100. The vehicle speed sensor 20 may detect a vehicle speed V by using any conventionally-known method. The vehicle speed sensor 20, which has detected a vehicle speed V, transfers data indicating the vehicle speed V to the lane keeping assist ECU 50.

Figure 2:
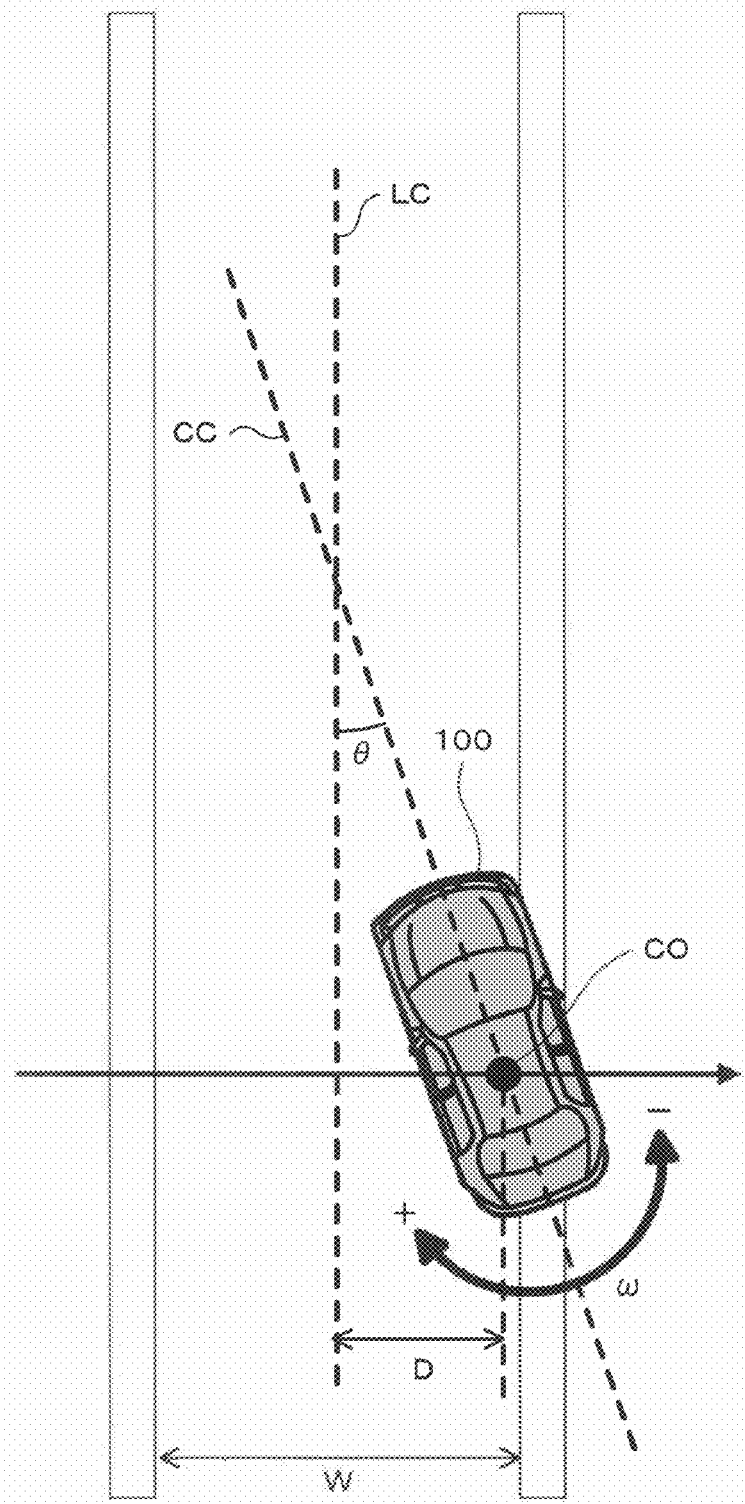
FIG. 2 is a diagram illustrating definition of parameters used for control by a lane keeping assist ECU 50.

The yaw rate sensor 30 is a sensor device for detecting a yaw rate ω of the vehicle 100. The yaw rate sensor 30 may detect a yaw rate ω by using any conventionally-known method. The yaw rate sensor 30, which has detected a yaw rate ω, transfers data indicating the yaw rate ω to the lane keeping assist ECU 50. As shown in FIG. 2, the yaw rate ω is represented by a positive value for leftward turning and by a negative value for rightward turning. FIG. 2 is a diagram illustrating definition of parameters used for control by the lane keeping assist ECU 50.

The direction indicator 40 is a device that receives an operation of the driver of the vehicle 100, and displays, based on the operation, the travel direction of the vehicle 100. The direction indicator 40 is provided with an operation lever that receives the driver's operation. The operation lever is movable in any of a left indicating position, an original position, and a right indicating position, depending on the driver's operation. Usually, the operation lever is set in the original position. While the operation lever is moved to either of the left indicating position and the right indicating position by the driver's operation, the direction indicator 40 transmits, to the lane keeping assist ECU 50, an indicator operation signal indicating that the direction indicator 40 is being operated by the driver.

The lane keeping assist ECU 50 is typically a processing device including an information processing device such as a CPU, a storage device such as a memory, an interface circuit, and the like. The lane keeping assist ECU 50 calculates, based on the information supplied from the above-described devices, a target lateral acceleration Gt that is required for the vehicle 100 to keep traveling along the travel lane. Then, the lane keeping assist ECU 50 transmits data indicating the calculated target lateral acceleration Gt to the steering control ECU 62 included in the steering device 60. The process of the lane keeping assist ECU 50 will be described later in detail with reference to FIG. 3.

The steering device 60 is a device for changing the travel direction of the vehicle 100 in accordance with the steering operation by the driver and the control information from the lane keeping assist ECU 50. The steering device 60 is provided with a steering sensor 61, a steering control ECU 62, and a steering actuator 63.

The steering sensor 61 is a sensor device for detecting information relating to the steering operation of the driver. The information detected by the steering sensor 61 includes a steering torque TM given to the steering by the driver's operation. The steering sensor 61 outputs the detected information such as a steering torque TM to the steering control ECU 62. The steering control ECU 62 is typically a processing device including an information processing device such as a CPU, a storage device such as a memory, an interface circuit, and the like. The steering control ECU 62 controls the steering actuator 63 in accordance with the information received from the lane keeping assist ECU 50 and the steering sensor 61. Specifically, the steering control ECU 62 calculates an amount of target steering torque, which is required for the lateral acceleration of the vehicle 100 to reach the target lateral acceleration Gt. Then, the steering control ECU 62 calculates a value of an auxiliary torque TA in accordance with the amount of target steering torque. The steering actuator 63 is typically an electric motor for giving the auxiliary torque TA to a steering shaft (not shown) of the vehicle 100.

Figure 3:
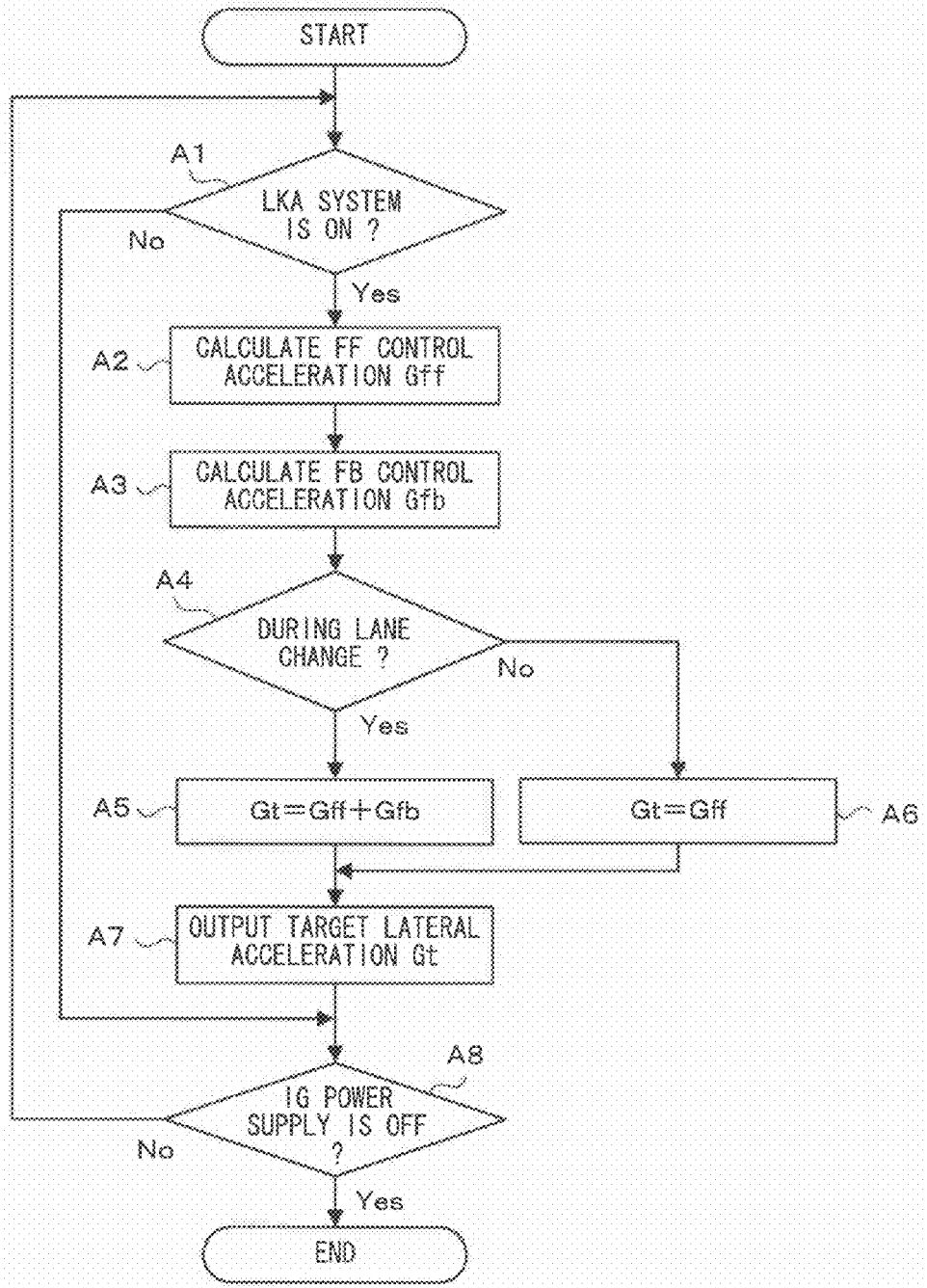
FIG. 3 is an example of a flowchart illustrating details of a process executed by the lane keeping assist ECU 50 of the first embodiment.

Next, a process executed by the lane keeping assist ECU 50 will be described with reference to FIG. 3. FIG. 3 is an example of a flowchart illustrating details of a process executed by the lane keeping assist ECU 50 according to the first embodiment. The lane keeping assist ECU 50 executes the process shown in FIG. 3 when an IG power supply of the vehicle 100 is ON. When the lane keeping assist ECU 50 starts the process of the flowchart shown in FIG. 3, the ECU 50 firstly executes a process of step A1.

In step A1, the lane keeping assist ECU 50 determines whether or not an LKA system is ON. The LKA system is a system for controlling traveling of the vehicle 100 so as to keep the vehicle in the travel lane. The steering assist device 1 according to the present invention operates as a part of the LKA system. ON/OFF of the operation state of the LKA system is arbitrarily switchable by the driver's controlling an interface (not shown) such as a switch, which is mounted on the vehicle 100. When it is determined that the LKA system is ON, the lane keeping assist ECU 50 goes to step A2. On the other hand, when it is determined that the LKA system is not ON, the lane keeping assist ECU 50 goes to step A8.

Figure 4:
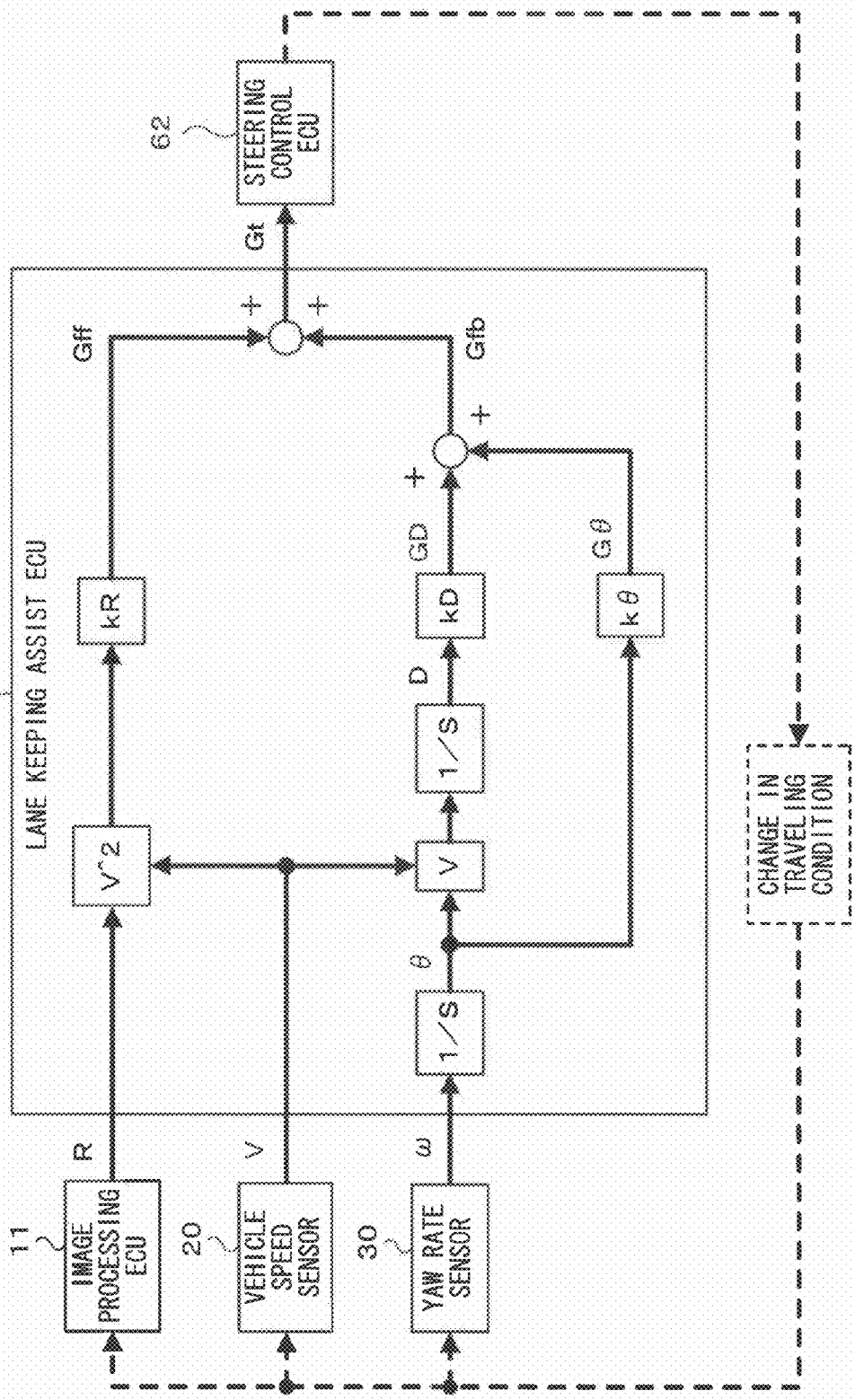
FIG. 4 is an example of a control block diagram illustrating the contents of a calculation process executed by the lane keeping assist ECU 50 of the first embodiment.

In step A2, the lane keeping assist ECU 50 calculates an FF control acceleration Gff. Specifically, as shown in FIG. 4, the lane keeping assist ECU 50 firstly obtains a curvature R of the travel lane from the image processing ECU 11, and a vehicle speed V from the vehicle speed sensor 20. Then, the lane keeping assist ECU 50 successively multiples the curvature R by the square of the vehicle speed V and by a gain value kR, thereby calculating an FF control acceleration Gff. That is, the FF control acceleration Gff is a value representing a lateral target acceleration which is required for the vehicle 100 to keep traveling along the curvature of the lane in which the vehicle currently travels. FIG. 4 is an example of a control block diagram illustrating the contents of a calculation process executed by the lane keeping assist ECU 50. The gain value kR is an arbitrary constant which is stored in the lane keeping assist ECU 50 in advance. Upon completion of the process of step A2, the lane keeping assist ECU 50 goes to step A3.

In step A3, the lane keeping assist ECU 50 calculates an FB control acceleration Gfb. Specifically, as shown in FIG. 4, the lane keeping assist ECU 50 firstly obtains a yaw rate $\omega$ from the yaw rate sensor 30. Next, the lane keeping assist ECU 50 calculates, as a yaw angle $\theta$ of the vehicle 100, a time-integrated value of the yaw rate $\omega$. The yaw angle $\theta$ is, as shown in FIG. 2, an angle of deflection of an axis line CC indicating the travel direction of the vehicle 100, with respect to a center line LC of the travel line. Further, the lane keeping assist ECU 50 performs time-integration on a value obtained by multiplying the yaw angle $\theta$ by the vehicle speed V, thereby calculating an offset distance D. The offset distance D is, as shown in FIG. 2, a distance from the center line LC of the travel lane to the vehicle 100. Then, the lane keeping assist ECU 50 adds a value obtained by multiplying the yaw angle $\theta$ by the gain value k$\theta$ to a value obtained by multiplying the offset distance D by the gain value kD, thereby calculating an FB control acceleration Gfb. That is, the FB control acceleration Gfb is a value representing a lateral target acceleration which is required for bringing the vehicle 100 back to the center of the travel lane. The gain value k$\theta$ and the gain value kD are arbitrary contents stored in the lane keeping assist ECU 50 in advance. Upon completion of the process of step A3, the lane keeping assist ECU 50 goes to step A4.

In the process of step A3, the lane keeping assist ECU 50 calculates a deflection angle $\theta$ based on the yaw rate $\omega$. However, the lane keeping assist ECU 50 may calculate a deflection angle $\theta$ based on the front image. Further, in the above description, an offset distance D is calculated based on the deflection angle $\theta$ and the vehicle speed V. However, the lane keeping assist ECU 50 may calculate an offset distance D based on the front image. Furthermore, the lane keeping assist ECU 50 may calculate a deflection angle $\theta$ and an offset distance D by using any conventionally known method instead of the above-described method.

The order of the process of step A2 and the process of step A3 may be reversed. If the lane keeping assist ECU 50 is able to execute the process of step A2 and the process of step A3 simultaneously, the ECU 50 may execute these processes simultaneously.

In step A4, the lane keeping assist ECU 50 determines whether or not the vehicle 100 is performing lane change. Specifically, the lane keeping assist ECU 50 determines whether or not the direction indicator 40 is being operated, based on an indicator operation signal transmitted from the direction indicator 40. When the lane keeping assist ECU 50 receives an indicator operation signal, the ECU 50 determines that the vehicle 100 is performing lane change, and goes to step A5. On the other hand, when the lane change lane keeping assist ECU 50 does not receive an indicator operation signal, the ECU 50 determines that the vehicle 100 is not performing lane change, and goes to step A6.

In step A5, the lane keeping assist ECU 50 adds the FF control acceleration Gff to the FB control acceleration Gfb, thereby calculating a value of a target lateral acceleration Gt. Upon completion of the process of step A5, the lane keeping assist ECU 50 goes to step A7.

In step A6, the lane keeping assist ECU 50 sets the value of the FF control acceleration Gff, as a value of a target lateral acceleration Gt. Upon completion of the process of step A6, the lane keeping assist ECU 50 goes to step A7.

In step A7, the lane keeping assist ECU 50 outputs the target lateral acceleration Gt to the steering control ECU 62. Upon completion of the process of step A7, the lane keeping assist ECU 50 goes to step A8.

In step A8, the lane keeping assist ECU 50 determines whether or not the IG power supply of the vehicle 100 is turned off. When it is determined that the IG power supply is turned off, the lane keeping assist ECU 50 ends the process of the flowchart shown in FIG. 3. On the other hand, when it is determined that the IG power supply is ON, the ECU 50 returns to step A1.

According to the process of the lane keeping assist ECU 50, which is shown in FIGS. 3 and 4, the lane keeping assist ECU 50 calculates the target lateral acceleration Gt based on the FF control acceleration Gff, and thereby controls the auxiliary torque TA so that the vehicle 100 performs turning in accordance with the curvature R of the travel lane. Further, the lane keeping assist ECU 50 calculates the target lateral acceleration Gt based on the FB control acceleration Gfb, and thereby controls the auxiliary torque TA so as to bring the position of the traveling vehicle 100 close to the center line of the travel lane. Hereinafter, control of the auxiliary torque TA based on the FF control acceleration Gff is referred to as "feed-forward control". In addition, control of the auxiliary torque TA based on the FB control acceleration Gfb is referred to as "feed-back control".

When the vehicle 100 is not performing lane change, the lane keeping assist ECU 50 calculates a target lateral acceleration Gt based on both of the FB control acceleration Gfb and the FF control acceleration Gff. That is, while the vehicle 100 is not performing lane change, the lane keeping assist ECU 50 controls the auxiliary torque TA by both of the feed-back control and the feed-forward control. On the other hand, while the vehicle 100 is performing lane change, the lane keeping assist ECU 50 calculates a target lateral acceleration Gt based on only the FF control acceleration Gff, without regard to the FB control acceleration Gfb. That is, while the vehicle 100 is performing lane change, the lane keeping assist ECU 50 halts the control of the auxiliary torque TA by the feed-back control, and controls the auxiliary torque TA by only the feed-forward control.

According to the control process, since the feed-back control is halted while the vehicle 100 is performing lane change, no auxiliary torque is generated in the direction in which the vehicle 100 is brought back to the lane in which the vehicle 100 was traveling before the lane change. On the other hand, since the feed-forward control is performed even during the lane change of the vehicle 100, an auxiliary torque required for curve traveling is generated. Accordingly, the steering assist device 1 can cause the steering device 60 to generate a required auxiliary torque TA without interfering with steering of the driver.

Figure 5:
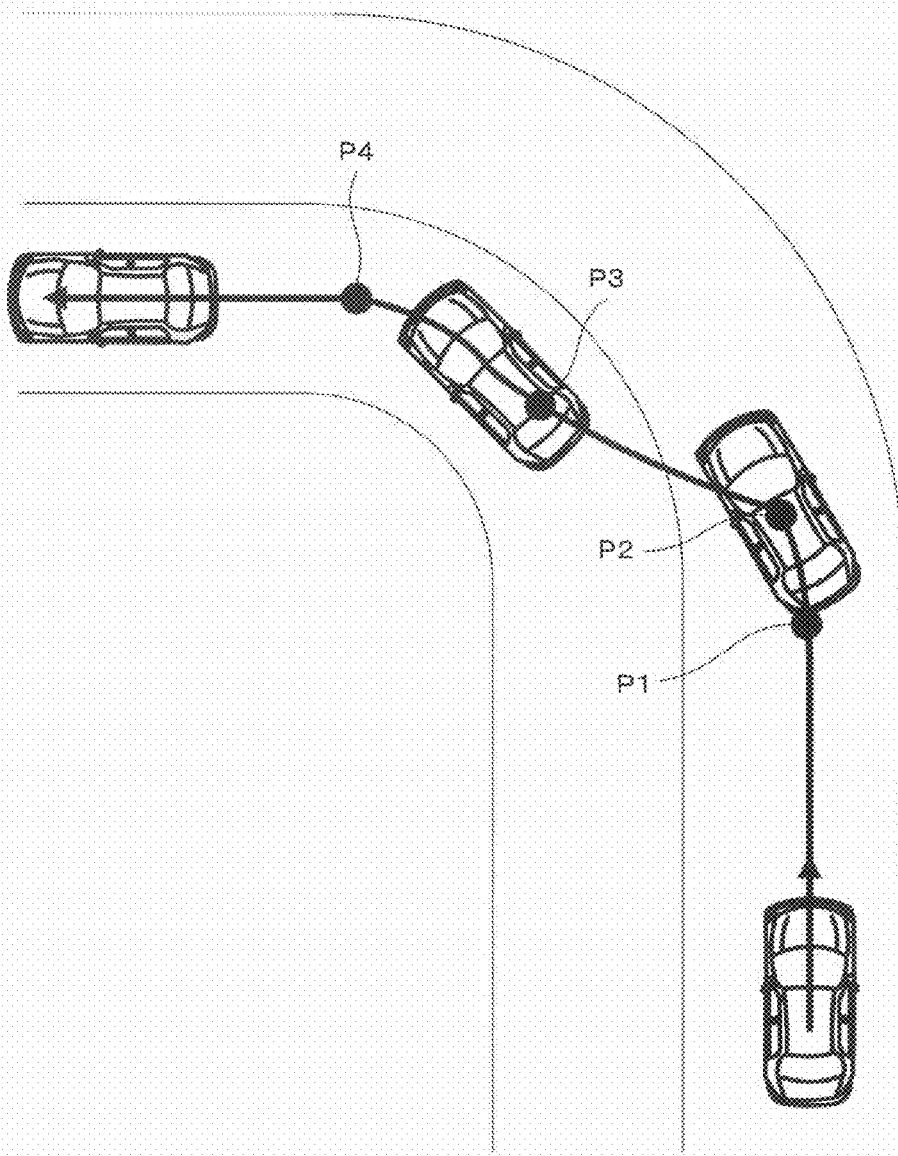
FIG. 5 is a diagram illustrating a track of a vehicle 100 which executes lane change in a curve section.

Next, a specific description will be given of a case where an appropriate auxiliary torque TA is generated by the steering assist device 1 and thus the steering load on the driver is satisfactorily reduced. For example, a state where the vehicle 100 is performing lane change in a curve section will be described. FIG. 5 is a diagram illustrating a track of the vehicle 100 performing lane change in the curve section.

In FIG. 5, position P1, position P2, position P3, and position P4 show the positions of the vehicle 100 at time t1, time t2, time t3, and time t4, respectively. At time t1, the vehicle 100 goes into the curve section, and starts to travel along the curve. At time t2, the vehicle 100 starts lane change from the outer lane to the inner lane of the curve. At time t3, the vehicle 100 completes the lane change. At time t4, the vehicle 100 passes through the curve section and travels on the straight lane.

Figure 6:
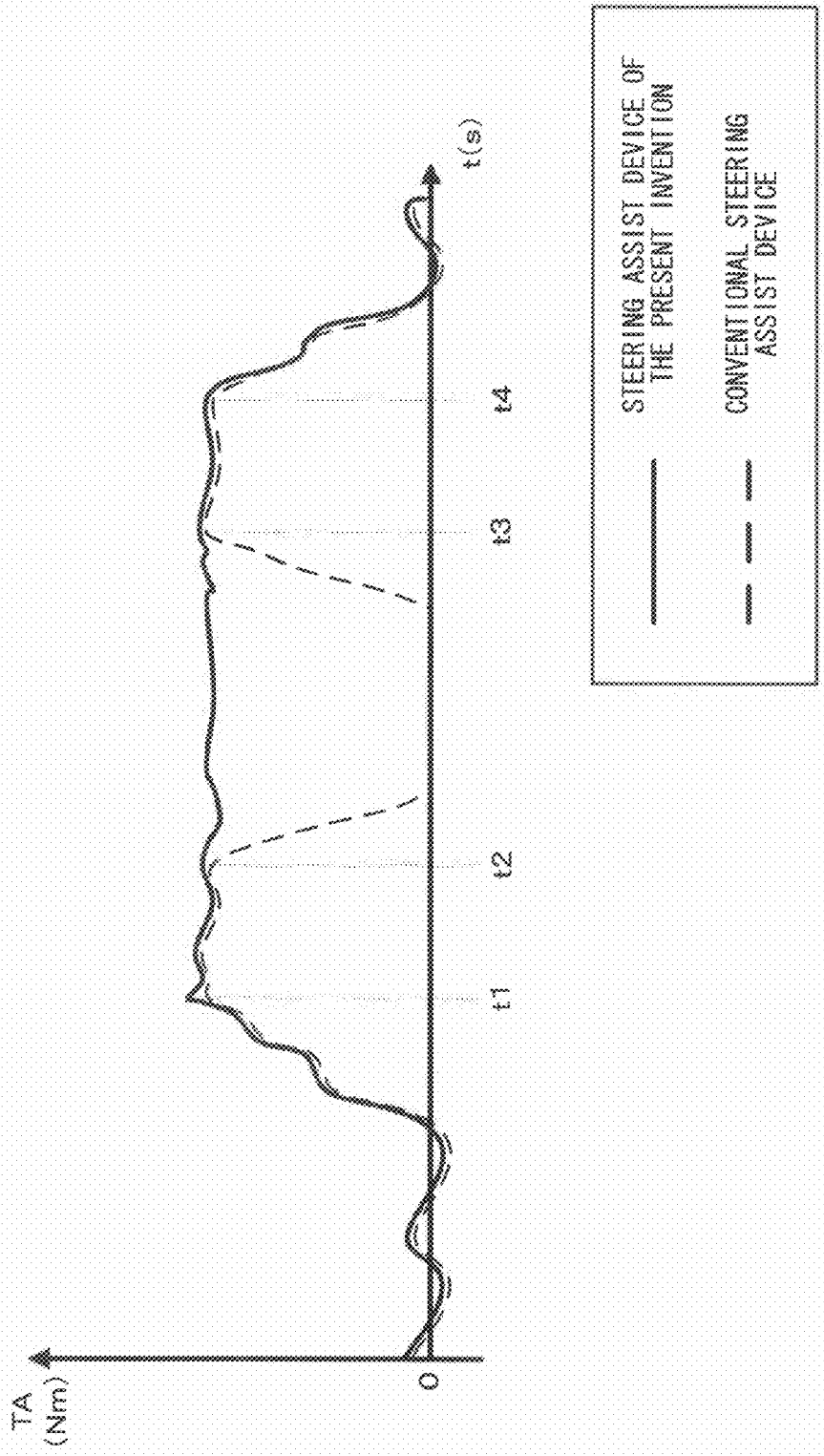
FIG. 6 is a diagram illustrating the values of auxiliary torque TA outputted from the steering assist device.
Figure 7:
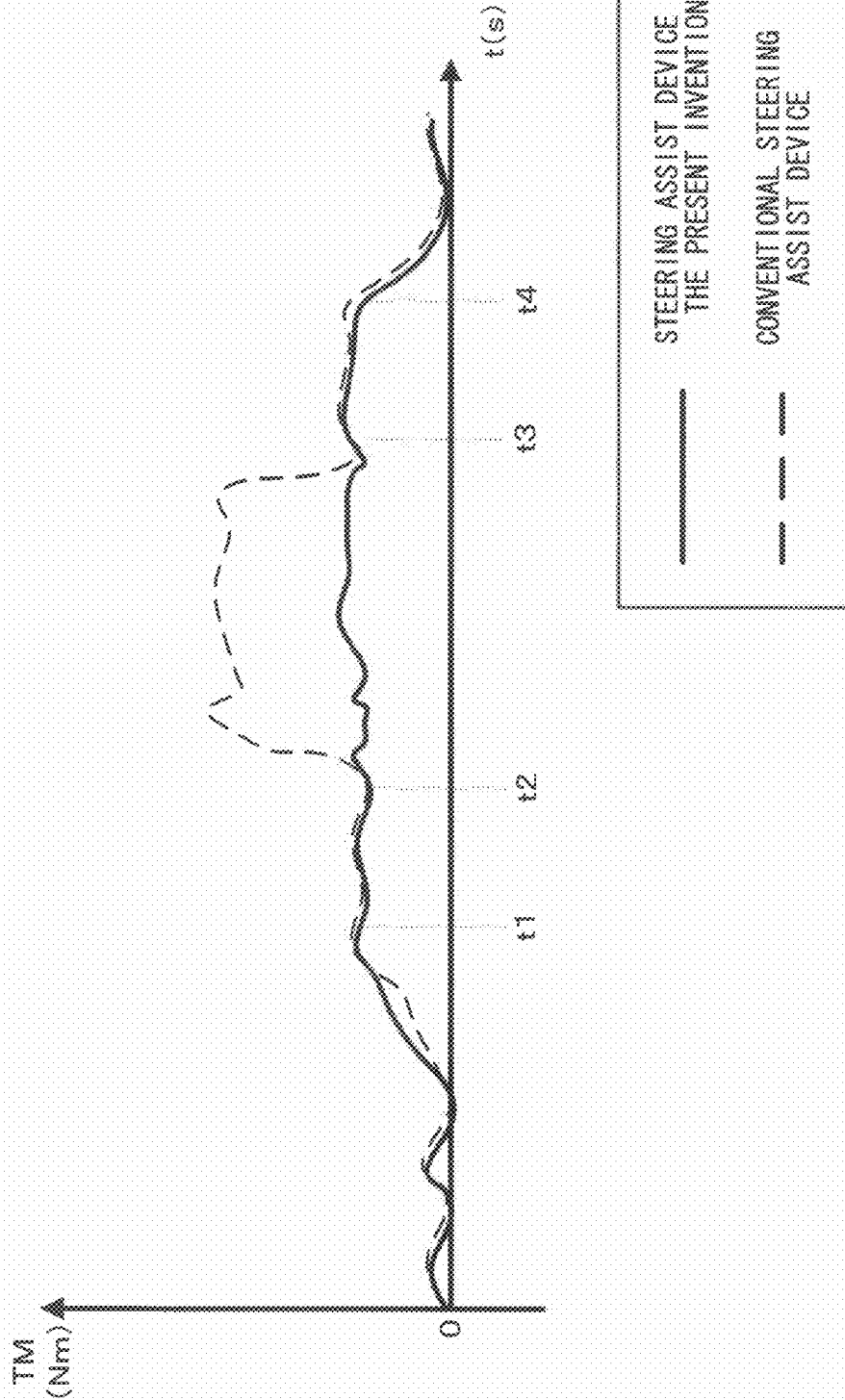
FIG. 7 is a diagram illustrating the values of steering torque TM given to a steering by a driver.

A description will be given of variations in the auxiliary torque TA and the steering load on the driver in the case where the vehicle 100 travels the route shown in FIG. 5, with reference to FIG. 6 and FIG. 7. FIG. 6 is a diagram illustrating the value of the auxiliary torque TA outputted from the steering assist device. FIG. 7 is a diagram illustrating the value of the steering torque TM given to the steering by the driver. It is considered that the value of the steering torque TM shown in FIG. 7 is proportional to the steering load on the driver.

In FIG. 6, a dashed line shows the value of an auxiliary torque outputted from a conventional steering assist device. In FIG. 7, a dashed line shows the value of a steering torque given to a steering by a driver who is assisted by the conventional steering assist device. The conventional steering assist device, as described above, halts the control for generating an auxiliary torque while the vehicle is performing lane change. Therefore, as shown in FIG. 6, the value of the auxiliary torque is reduced in a period from time t2 to time t3. As a result, as shown in FIG. 7, the steering torque given to the steering by the driver rapidly increases during the period from time t2 to time t3.

On the other hand, according to the steering assist device 1 of the present invention, while the vehicle 100 is performing lane change, the control of the auxiliary torque TA in accordance with the yaw angle θ and the offset distance D is suppressed, but the control of the auxiliary torque TA in accordance with the curvature R is continuously executed. Therefore, as shown in FIG. 6, the value of the auxiliary torque TA is not extremely reduced during the period from time t2 to time t3. In FIG. 6, a solid line shows the value of the auxiliary torque TA outputted from the steering assist device 1. Accordingly, as shown in FIG. 7, the steering torque TM given to the steering by the driver is not increased during the period from time t2 to time t3. In FIG. 7, a solid line shows the value of the steering torque TM given to the steering by the driver who is assisted by the steering assist device 1. That is, the steering assist device 1 enables the driver to drive the vehicle 100 with a steering load smaller than that of the conventional steering assist device.

As described above, the steering assist device 1 according to the first embodiment of the present invention can output a required auxiliary torque while suppressing generation of an auxiliary torque that interferes with lane change. That is, the steering assist device 1 can appropriately reduce the steering load on the driver.

Second Embodiment

In the above-described first embodiment, whenever the vehicle 100 is performing lane change, the lane keeping assist ECU 50 always halts the control of the auxiliary torque TA by the feed-back control. However, the lane keeping assist ECU 50 may halt the feed-back control only when the vehicle 100 is performing lane change and it is determined that the auxiliary torque by the feed-back control interferes with the driver's operation. Specifically, the lane keeping assist ECU 50 determines that the auxiliary torque by the feed-back control interferes with the driver's operation when the direction in which the vehicle 100 turns due to the auxiliary torque by the feed-back control, i.e., the direction in which the FB control acceleration Gfb acts, is different from the direction of lane change of the vehicle 100.

Hereinafter, a steering assist device according to a second embodiment will be described. The configuration of the steering assist device according to the second embodiment is identical to that of the first embodiment except the process executed by the lane keeping assist ECU 50 and the information outputted from the direction indicator 40. Therefore, detailed description of the configuration will be omitted.

While the operation lever of the direction indicator 40 of the second embodiment is being operated, the direction indicator 40 transmits, to the lane keeping assist ECU 50, together with the indicator operation signal, an indicated direction signal indicating which direction (i.e., left or right) the direction indicator 40 indicates.

Figure 8:
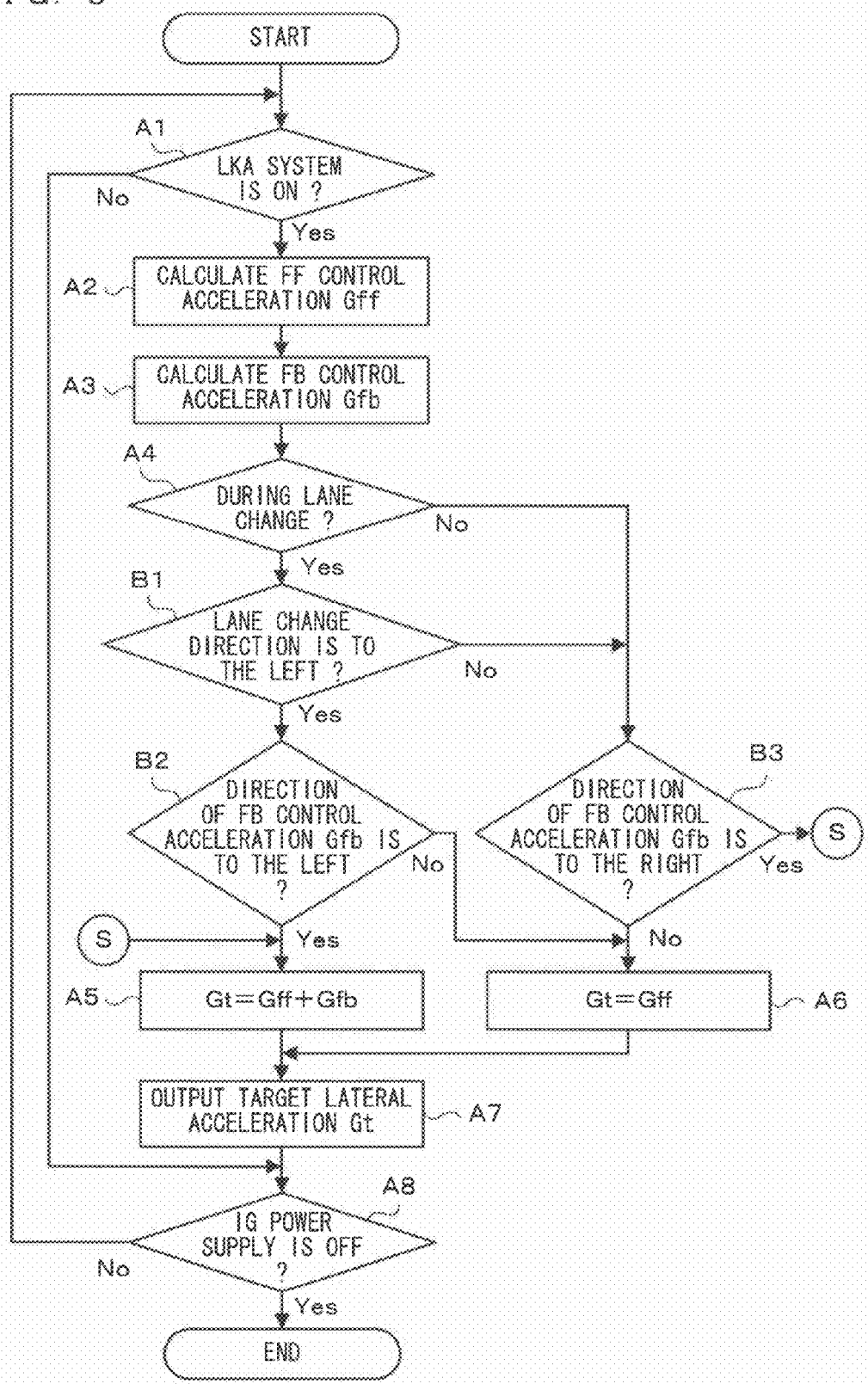
FIG. 8 is an example of a flowchart illustrating the details of a process executed by a lane keeping assist ECU 50 according to a second embodiment.

Next, a process executed by the lane keeping assist ECU 50 of the second embodiment will be described with reference to FIG. 8. FIG. 8 is an example of a flowchart illustrating the details of a process executed by the lane keeping assist ECU 50 of the second embodiment. In FIG. 8, the steps performing the same processes as those of the first embodiment are given the same reference numeral to omit description thereof. When the process of the flowchart of FIG. 8 is started, the lane keeping assist ECU 50 of the second embodiment executes the processes of steps A1 to A3 in similar manner to that described for the first embodiment.

When the lane keeping assist ECU 50 of the second embodiment determines in step A4 that the vehicle 100 is performing lane change, the ECU 50 goes to step B1. On the other hand, when the lane keeping assist ECU 50 determines in step A4 that the vehicle 100 is not performing lane change, the ECU 50 goes to step B3.

In step B1, the lane keeping assist ECU 50 determines whether or not the lane change direction of the vehicle 100 is left. Specifically, the lane keeping assist ECU 50 determines whether an indicated direction signal indicating "left" is received from the direction indicator 40. When an indicated direction signal indicating "left" is received from the direction indicator 40, the lane keeping assist ECU 50 determines that the lane change direction of the vehicle 100 is left, and goes to step B2. On the other hand, when an indicated direction signal indicating "left" is not received from the direction indicator 40, the lane keeping assist ECU 50 determines that the lane change direction of the vehicle 100 is right, and goes to step B3.

In step B2, the lane keeping assist ECU 50 determines whether or not the direction in which the FB control acceleration Gfb of the vehicle 100 acts is left. Specifically, the lane keeping assist ECU 50 determines whether or not the value of the FB control acceleration Gfb is a positive value. When the value of the FB control acceleration Gfb is a positive value, the lane keeping assist ECU 50 determines that the direction in which the FB control acceleration Gfb of the vehicle 100 acts is left, and goes to step A5. On the other hand, when the value of the FB control acceleration Gfb is a negative value, the lane keeping assist ECU 50 determines that the direction in which the FB control acceleration Gfb of the vehicle 100 acts is right, and goes to step A6.

In step B3, the lane keeping assist ECU 50 determines whether or not the direction in which the FB control acceleration Gfb of the vehicle 100 acts is right. Specifically, the lane keeping assist ECU 50 determines whether or not the value of the FB control acceleration Gfb is a negative value. When the value of the FB control acceleration Gfb is a negative value, the lane keeping assist ECU 50 determines that the direction in which the FB control acceleration Gfb of the vehicle 100 acts is right, and goes to step A5. On the other hand, when the value of the FB control acceleration Gfb is a positive value, the lane keeping assist ECU 50 determines that the direction in which the FB control acceleration Gfb of the vehicle 100 acts is left, and goes to step A6.

As for the processes in steps A5 to A8, the lane keeping assist ECU 50 of the second embodiment performs the same processes as those described for the first embodiment.

As described above, the lane keeping assist ECU 50 of the second embodiment sets, as a value of the target lateral acceleration Gt, a value obtained by adding the FF control acceleration Gff to the FB control acceleration Gfb, when the vehicle 100 is performing lane change, and the lane change direction of the vehicle 100 and the direction in which the acceleration Gfb acts are the same direction (left or right). That is, the lane keeping assist ECU 50 halts the control of the auxiliary torque TA by the feed-back control and controls the auxiliary torque TA by only the feed-forward control, when the vehicle 100 is performing lane change, and the lane change direction and the direction in which the acceleration Gfb acts are different directions (one is left and the other is right).

On the other hand, the lane keeping assist ECU 50 sets, as a value of the target lateral acceleration Gt, the value of the FF control acceleration Gff as it is, when the vehicle 100 is performing lane change, and the lane change direction of the vehicle 100 and the direction in which the acceleration Gfb acts are different directions. That is, the lane keeping assist ECU 50 controls the auxiliary torque TA by the feed-forward control and the feed-back control, when the vehicle 100 is performing lane change, and the lane change direction and the direction in which the acceleration Gfb acts are the same direction.

According to the process of the lane keeping assist ECU 50 of the second embodiment, while the vehicle 100 is performing lane change, if the direction in which the auxiliary torque by the feed-back control acts does not meet the driver's intention, the control of the auxiliary torque TA by the feed-forward control is halted. Accordingly, the steering assist device of the second embodiment, like the steering assist device of the first embodiment, can output an auxiliary torque required for curve traveling or the like while halting generation of an auxiliary torque that interferes with lane change.

Further, according to the process of the above-described lane keeping assist ECU 50, as for the lane change direction, i.e., the direction intended by the driver, an increase in the auxiliary torque by the feed-back control is allowed even during lane change. Accordingly, for example, when the vehicle 100 performing lane change is pushed back to the lane in which the vehicle 100 was traveling, due to a disturbance such as crosswind, the auxiliary torque in the lane change direction may be increased by not only the feed-forward control but also the feed-back control. Therefore, according to the steering assist device of the second embodiment, the driver of the vehicle 100 can perform the lane change operation of the vehicle 100 with less steering load.

In the second embodiment, the lane keeping assist ECU 50 determines the lane change direction of the vehicle 100 based on the indicated direction signal. However, the lane keeping assist ECU 50 may determine the lane change direction of the vehicle 100 by any other method. For example, the lane keeping assist ECU 50 may determine the lane change direction of the vehicle 100 based on the steering angle or steering torque of the vehicle 100.

Third Embodiment

In the above-described first and second embodiments, the lane keeping assist ECU 50 halts the feed-back control while the vehicle 100 is performing lane change. However, the lane keeping assist ECU 50 may perform control for suppressing the feed-back control without completely halting the feed-back control. Specifically, the lane keeping assist ECU 50 may suppress the feed-back control by controlling a gain value kD and a gain value kθ relating to the feed-back control.

The following will describe a steering assist device according to a third embodiment. The configuration of the steering assist device of the third embodiment is identical to that of the first embodiment except the process executed by the lane keeping assist ECU 50. Therefore, detailed description of the configuration will be omitted.

Figure 9:
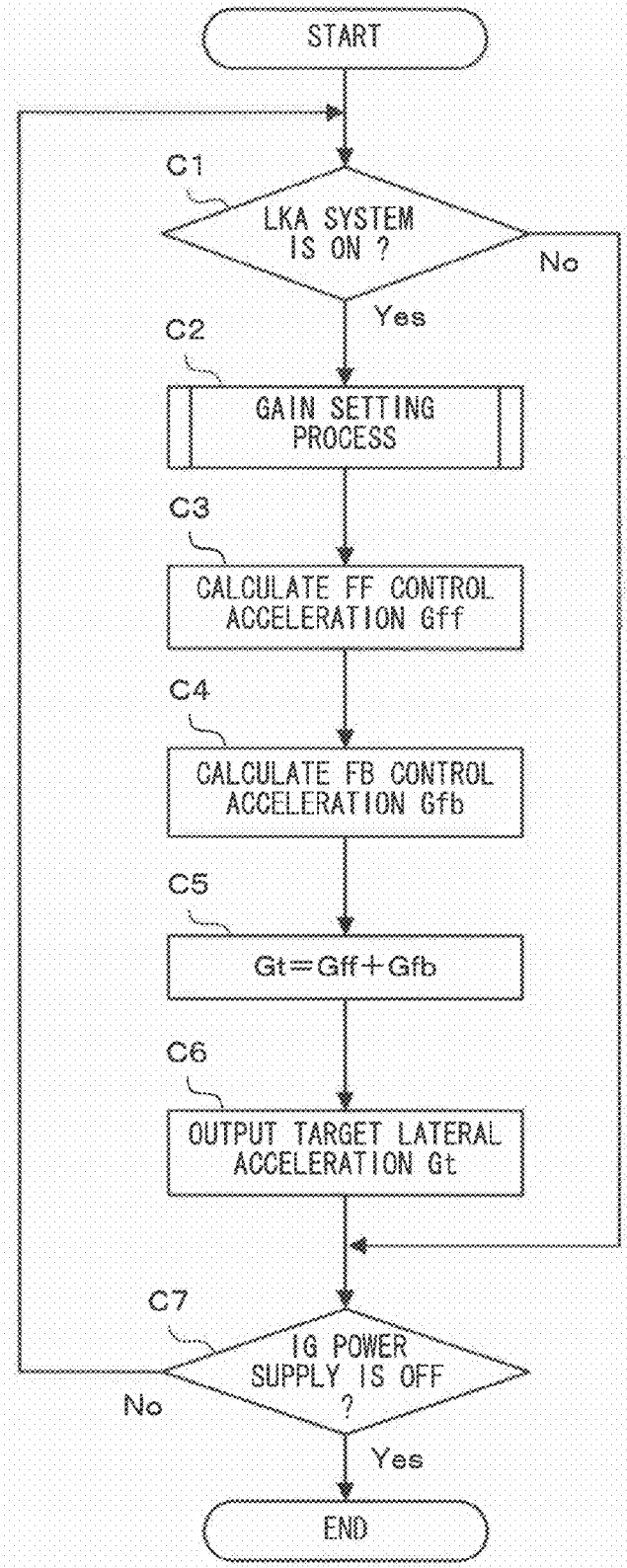
FIG. 9 is an example of a flowchart illustrating the details of a process executed by a lane keeping assist ECU 50 according to a third embodiment.

FIG. 9 is an example of a flowchart illustrating the details of the process executed by the lane keeping assist ECU 50 of the third embodiment. The lane keeping assist ECU 50 executes the process shown in FIG. 9 when the IG power supply of the vehicle 100 is in its ON state. When the lane keeping assist ECU 50 starts the process of the flowchart shown in FIG. 3, the ECU 50 firstly executes a process of step C1.

In step C1, the lane keeping assist ECU 50 determines whether or not the LKA system is ON, in similar manner to the process of step A1. When it is determined that the LKA system is ON, the lane keeping assist ECU 50 goes to step C2. On the other hand, when it is determined that the LKA system is not ON, the lane keeping assist ECU 50 goes to step C7.

Figure 10:
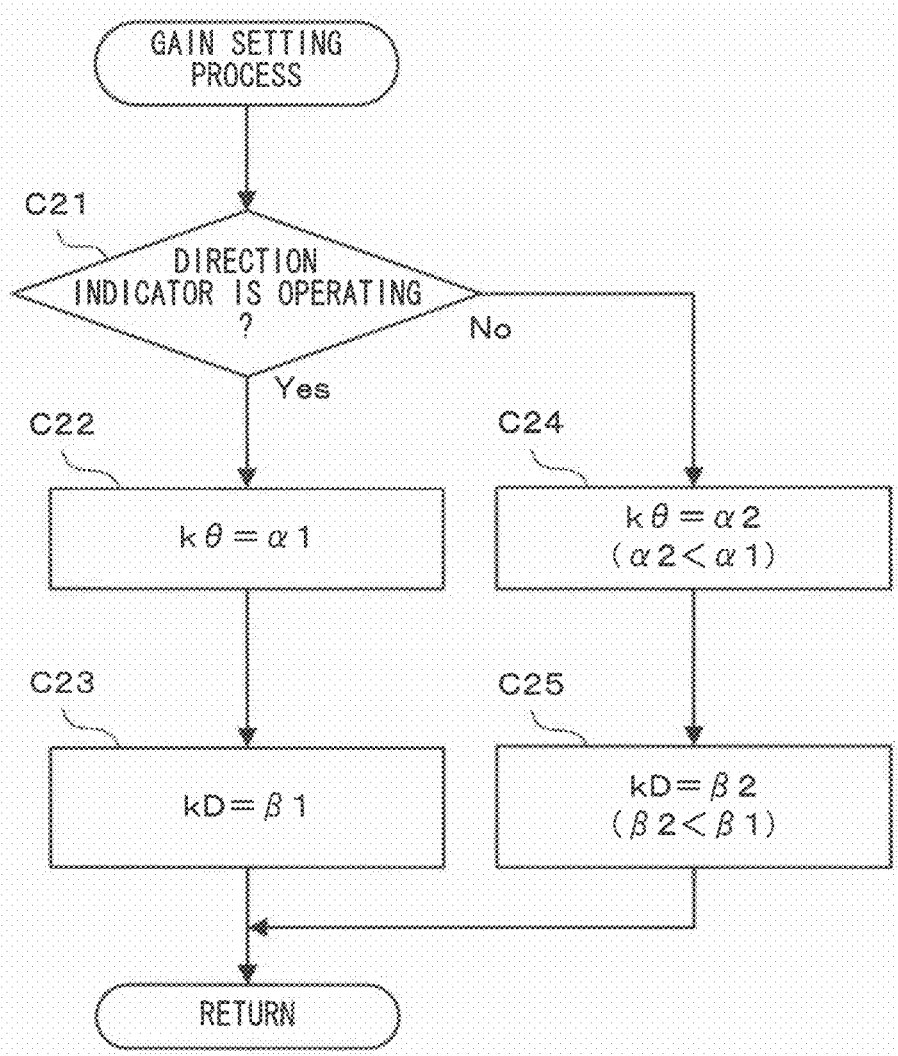
FIG. 10 is an example of a flowchart illustrating a gain setting process executed by the lane keeping assist ECU 50 of the third embodiment.

In step C2, the lane keeping assist ECU 50 executes a gain setting process. The gain setting process is a process for controlling a gain value kD and a gain value kθ relating to feed-back control Hereinafter, the gain setting process will be described in detail with reference to FIG. 10. FIG. 10 is an example of a flowchart illustrating the gain setting process executed by the lane keeping assist ECU 50 of the third embodiment. When the lane keeping assist ECU 50 starts the gain setting process, the ECU 50 firstly executes a process of step C21.

In step C21, the lane keeping assist ECU 50 determines whether or not the vehicle 100 is performing lane change, in similar manner to that of step A4. When it is determined that the vehicle 100 is performing lane change, the lane keeping assist ECU 50 goes to step C22. On the other hand, when the lane keeping assist ECU 50 does not receive an indicator operation signal, the ECU 50 determines that the vehicle 100 is not performing lane change, and goes to step C24.

In step C22, the lane keeping assist ECU 50 sets the gain value kθ to a normal value α1. The normal value α1 is a predetermined arbitrary constant. The normal value α1 is stored in the storage device of the lane keeping assist ECU 50 in advance. Upon completion of the process of step C22, the lane keeping assist ECU 50 goes to step C23.

In step C23, the lane keeping assist ECU 50 sets the gain value kD to a normal value β1. The normal value β1 is a predetermined arbitrary constant. The normal value β1 is stored in the storage device of the lane keeping assist ECU 50 in advance. Upon completion of the process of step C23, the lane keeping assist ECU 50 ends the gain setting process, and goes to step C3 shown in FIG. 9.

In step C24, the lane keeping assist ECU 50 sets the gain value kθ to a correction value α2. The correction value α2 is an arbitrary constant smaller than the normal value α1. The correction value α2 is stored in the storage device of the lane keeping assist ECU 50 in advance. Upon completion of the process of step C24, the lane keeping assist ECU 50 goes to step C25.

In step C25, the lane keeping assist ECU 50 sets the gain value kD to a correction value β2. The correction value β2 is an arbitrary constant smaller than the normal value β1. The correction value β2 is stored in the storage device of the lane keeping assist ECU 50 in advance. Upon completion of the process of step C25, the lane keeping assist ECU 50 ends the gain setting process, and goes to step C3 in FIG. 9.

In step C3, the lane keeping assist ECU 50 calculates a FF control acceleration Gff, in similar manner to that of step A2. Upon completion of the process of step C3, the lane keeping assist ECU 50 goes to step C4.

In step C4, the lane keeping assist ECU 50 calculates a FB control acceleration Gfb, in similar manner to that of step A3. Upon completion of the process of step C4, the lane keeping assist ECU 50 goes to step C5.

The order of the process of step C3 and the process of step C4 may be reversed. If the lane keeping assist ECU 50 is able to execute the processes of step C3 and step C4 simultaneously, the ECU 50 may execute these processes simultaneously.

In step C5, the lane keeping assist ECU 50 sets, as a value of the target lateral acceleration Gt, a value obtained by adding the FF control acceleration Gff to the FB control acceleration Gfb. Upon completion of the process of step C5, the lane keeping assist ECU 50 goes to step C6.

In step C6, the lane keeping assist ECU 50 outputs the target lateral acceleration Gt to the steering control ECU 62. Upon completion of the process of step C6, the lane keeping assist ECU 50 goes to step C7.

In step C7, the lane keeping assist ECU 50 determines whether or not the IG power supply of the vehicle 100 is turned off. When the lane keeping assist ECU 50 determines that the IG power supply is turned off, the ECU 50 ends the process of the flowchart shown in FIG. 9. On the other hand, when the lane keeping assist ECU 50 determines that the IG power supply is in its ON state, the ECU 50 goes to step C1.

According to the process of the lane keeping assist ECU 50 of the third embodiment, the gain value kD and the gain value kθ are set to the smaller values when the vehicle 100 is performing lane change than when the vehicle 100 is not performing lane change. That is, while the vehicle 100 is performing lane change, an increase in the auxiliary torque due to the feed-back control can be suppressed. Accordingly, the steering assist device of the third embodiment, like the steering assist device of the first embodiment, can output a required auxiliary torque TA while suppressing generation of an auxiliary torque that interferes with lane change.

Further, the steering assist device of the third embodiment can arbitrarily adjust the degree of suppression of the feed-back control by changing the set values of the correction value α2 and the correction value β2. If each of the correction value α2 and the correction value β2 is set to 0 in advance, the value of the FB control acceleration Gfb is also 0 while the vehicle 100 is performing lane change. That is, when each of the correction value α2 and the correction value β2 is set to 0 in advance, control of the auxiliary torque TA by the feed-back control can be substantially halted while the vehicle 100 is performing lane change.

In the third embodiment, the control of the auxiliary torque TA by the feed-back control is suppressed by changing the gain value kD and the gain value kθ. However, the lane keeping assist ECU 50 may suppress the control for increasing/decreasing the auxiliary torque TA, by decreasing the values of the yaw angle θ and the offset distance D which are input values in the feed-back control.

In the respective embodiments described above, the lane keeping assist ECU 50 determines whether or not the vehicle 100 is performing lane change, depending on whether or not the direction indicator 40 is being operated. However, the lane keeping assist ECU 50 may use other methods to determine whether or not the vehicle 100 is performing lane change.

For example, the lane keeping assist ECU 50 may determine whether or not the vehicle 100 is performing lane change, based on the magnitude of the steering torque TM of the driver. Specifically, the lane keeping assist ECU 50 determines, in step A4 and step C21, whether or not the value of the steering torque TM obtained from the steering sensor 61 is equal to or greater than a steering torque threshold value TMth. When the value of the steering torque TM is equal to or greater than the steering torque threshold value TMth, the lane keeping assist ECU 50 determines that the vehicle 100 is performing lane change. On the other hand, when the value of the steering torque TM is smaller than the steering torque threshold value TMth, the lane keeping assist ECU 50 determines that the vehicle 100 is not performing lane change.

Preferably, the steering torque threshold value TMth is changed as needed, in accordance with the value of the curvature R by the lane keeping assist ECU 50. Specifically, when the lane keeping assist ECU 50 starts the process of step A4 (step C21), the ECU 50 calculates, as the steering torque threshold value TMth, a value obtained by multiplying the curvature R by a predetermined coefficient, and then executes the above-described determination process. The steering torque TM is a relatively great value not only when the vehicle 100 is performing lane change but also when the vehicle 100 is performing curve traveling. Therefore, setting of the steering torque threshold value TMth based on the curvature R enables the lane keeping assist ECU 50 to estimate that the vehicle 100 is performing lane change, only when a steering torque TM equal to or greater than the steering torque required for curve traveling is generated. That is, according to the process of the lane keeping assist ECU 50, it is possible to accurately determine, based on the steering torque TM, whether or not the vehicle 100 is performing lane change.

Alternatively, the lane keeping assist ECU 50 may determine whether or not the vehicle 100 is performing lane change, based on the degree of a steering angle Φ of the vehicle 100. Specifically, the lane keeping assist ECU 50 determines, in step A4 and step C21, whether or not the value of a steering angle Φ obtained from the steering sensor 61 is equal to or greater than a steering angle threshold value Φth. When the value of the steering angle Φ is equal to or greater than the steering angle threshold value Φth, the lane keeping assist ECU 50 determines that the vehicle 100 is performing lane change. On the other hand, when the value of the steering angle Φ is smaller than the steering angle threshold value Φth, the lane keeping assist ECU 50 determines that the vehicle 100 is not performing lane change.

Preferably, the steering angle threshold value Φth is changed as needed, in accordance with the value of the curvature R by the lane keeping assist ECU 50. Specifically, when the process of step A4 (step C21) is started, the lane keeping assist ECU 50 firstly calculates, as the steering angle threshold value Φth, a value obtained by multiplying the curvature R by a predetermined coefficient, and then executes the above-described determination process. The steering angle Φ is a relatively great value not only when the vehicle 100 is performing lane change but also when the vehicle 100 is performing curve traveling. Therefore, setting of the steering angle threshold value Φth based on the curvature R as described above enables the lane keeping assist ECU 50 to estimate that the vehicle 100 is performing lane change, only when the steering is turned exceeding a steering angle required for curve traveling. That is, according to the process of the lane keeping assist ECU 50, it is possible to accurately determine whether or not the vehicle 100 is performing lane change, based on the steering angle Φ.

Further, the lane keeping assist ECU 50 may determine, based on the magnitude of the offset distance D, whether or not the vehicle 100 is performing lane change. Specifically, the lane keeping assist ECU 50 determines, in step A4 and step C21, whether or not the value of the offset distance D is equal to or greater than an offset distance threshold value Dth. When the value of the offset distance D is equal to or greater than the offset distance threshold value Dth, the lane keeping assist ECU 50 determines that the vehicle 100 is performing lane change. On the other hand, when the value of the offset distance D is smaller than the offset distance threshold value Dth, the lane keeping assist ECU 50 determines that the vehicle 100 is not performing lane change.

Preferably, the offset distance threshold value Dth is set in accordance with the value of lane width W of the travel lane. Specifically, the image processing ECU 11 detects the lane width W based on the front image, and transmits data indicating the land width W to the lane keeping assist ECU 50. When the lane keeping assist ECU 50 starts the process of step A4 (step C21), the ECU 50 firstly calculates, as the offset distance threshold value Dth, a value obtained by multiplying the lane width W received from the image processing ECU 11 by a predetermined coefficient such as ½, and then executes the above-described determination process. The above-described setting of the offset distance threshold value Dth enables the lane keeping assist ECU 50 to determine that the vehicle 100 is performing lane change, when the vehicle 100 enters the adjacent lane by half of its width.

Further, the lane keeping assist ECU 50 may determine whether or not the vehicle 100 is performing lane change, based on not only the operation state of the direction indicator 40 but also the operation state of a hazard lamp device of the vehicle 100. Specifically, the lane keeping assist ECU 50 is electrically connected to the hazard lamp device of the vehicle 100. Then, the hazard lamp device transmits a hazard operation signal to the lane keeping assist ECU 50 while the hazard lamp device is blinking in accordance with an input operation from the driver. Then, the lane keeping assist ECU 50 determines, in step A4 and step C21, whether or not a hazard operation signal is received. The lane keeping assist ECU 50 determines that the vehicle 100 is performing lane change when the ECU 50 receives a hazard operation signal. On the other hand, the lane keeping assist ECU 50 determines that the vehicle 100 is not performing lane change when the ECU 50 does not receive a hazard operation signal. For example, there is an emergency case where the driver of the vehicle 100 pulls off to the side of the road with the hazard lamp blinking. In such a case, it is preferred to suppress generation of an auxiliary torque that brings the vehicle back to the center of the lane. According to the above-described process of the lane keeping assist ECU 50, the driver can perform the steering operation of the vehicle 100 with steering load less than that of the conventional device, even while the hazard lamp is operated.

INDUSTRIAL APPLICABILITY

The steering assist device according to the present invention is useful as a steering assist device or the like capable of appropriately reducing the steering load on the driver.

DESCRIPTION OF THE REFERENCE CHARACTERS

1 steering assist device
10 front monitoring camera 11 image processing ECU
20 vehicle speed sensor
30 yaw rate sensor
40 direction indicator
50 lane keeping assist ECU
60 steering device
61 steering sensor
62 steering control ECU
63 steering actuator
100 vehicle

The invention claimed is:

1. A steering assist device for assisting a steering operation of a driver who drives a vehicle, the device comprising:
   a controller that controls an auxiliary torque that assists a steering of the driver, the auxiliary torque including a first auxiliary torque based on a curvature of a travel lane and a second auxiliary torque based on a position of the vehicle in the travel lane in which the vehicle travels; and
   a lane change detector that detects a lane change of the vehicle, wherein
   when a lane change of the vehicle is not detected, the controller controls the auxiliary torque such that both the first auxiliary torque based on the curvature of the travel lane and the second auxiliary torque based on the position of the vehicle are provided, and
   upon detection of a lane change of the vehicle, the controller controls the auxiliary torque such that the first auxiliary torque based on the curvature of the travel lane is continuously provided and the second auxiliary torque based on the position of the vehicle is stopped from being provided.

2. The steering assist device according to claim 1, further comprising:
   an imaging section that obtains an image in front of the vehicle;
   a curvature calculation section that calculates, based on the image, a curvature of the travel lane in which the vehicle travels;
   an offset distance calculation section that calculates an offset distance from the center line of the travel lane to the vehicle; and
   a deflection angle calculation section that calculates a deflection angle which is formed by a straight line indicating a direction along which the vehicle travels, and the center line of the travel lane, wherein
   the controller controls the first auxiliary torque based on the curvature calculated by the curvature calculation section and controls the second auxiliary torque based on at least one of the offset distance and the deflection angle.

3. The steering assist device according to claim 1 or 2, further comprising:
   a lane change direction detector that detects a direction of the lane change; and
   an acting direction detector that detects a direction of the auxiliary torque that acts on the vehicle, wherein
   the controller stops generating the second auxiliary torque based on the position of the vehicle only when the direction of the lane change is different from a direction of turning.

4. The steering assist device according to claim 1, wherein the controller determines that the vehicle makes a lane change when a direction indicator mounted on the vehicle is being operated, and determines that the vehicle does not make a lane change when the direction indicator is not being operated.

5. The steering assist device according to claim 1, further comprising:
   a steering torque detector that detects a steering torque generated by an operation of the driver of the vehicle, wherein
   the controller determines that the vehicle makes a lane change when the steering torque is equal to or greater than a predetermined steering torque threshold value, and determines that the vehicle does not make a lane change when the steering torque is smaller than the predetermined steering torque threshold value.

6. The steering assist device according to claim 5, further comprising:
   a steering torque threshold calculation section that calculates the steering torque threshold value based on the curvature of the travel lane in which the vehicle travels.

7. The steering assist device according to claim 1, further comprising:
   a steering angle detection section that detects a steering angle of the vehicle, wherein
   the controller determines that the vehicle makes a lane change when the steering angle is equal to or greater than a predetermined steering angle threshold value, and determines that the vehicle does not make a lane change when the steering angle is smaller than the predetermined steering angle threshold value.

8. The steering assist device according to claim 7, further comprising:
   a steering angle threshold calculation section that calculates the steering angle threshold value based on the curvature of the travel lane in which the vehicle travels.

9. The steering assist device according to claim 2, wherein the controller determines that the vehicle makes a lane change when the offset distance is equal to or longer than a predetermined distance threshold value, and determines that the vehicle does not make a lane change when the offset distance is shorter than the predetermined distance threshold value.

10. The steering assist device according to claim 9, further comprising:
    a lane width calculation section that calculates a width of the travel lane in which the vehicle travels; and
    a threshold calculation section that calculates the predetermined distance threshold value based on the width of the travel lane.

11. The steering assist device according to claim 1, wherein the controller determines that the vehicle makes a lane change when a hazard lamp mounted on the vehicle is being operated, and determines that the vehicle does not make a lane change when the hazard lamp is not operated.

12. The steering assist device according to claim 2, wherein the controller controls the second auxiliary torque based on the position of the vehicle in the travel lane such that the greater a value obtained by multiplying the offset distance and the deflection angle by predetermined gain values, respectively, is, the greater the second auxiliary torque is, and
    the controller changes gain values for the offset distance and the deflection angle to smaller values, respectively when the lane change detector detects a lane change than when the lane change detector does not detect a lane change.

13. The steering assist device according to claim 2, wherein the controller controls the second auxiliary torque based on the position of the vehicle in the travel lane such that the greater the offset distance and the deflection angle are, the greater the second auxiliary torque is, and the controller corrects values of the offset distance and the deflection angle to smaller values when the lane change detector detects a lane change than when the lane change detector does not detect a lane change.

\* \* \* \* \*